(12) United States Patent
Liardet et al.

(10) Patent No.: US 8,582,765 B2
(45) Date of Patent: Nov. 12, 2013

(54) MASKING OF DATA IN A CALCULATION

(75) Inventors: Pierre-Yvan Liardet, Peynier (FR); Yannick Teglia, Marseilles (FR)

(73) Assignee: STMicroelectronics S.A., Montrouge (FR)

( * ) Notice: Subject to any disclaimer, the term of this patent is extended or adjusted under 35 U.S.C. 154(b) by 1069 days.

(21) Appl. No.: 12/182,408

(22) Filed: Jul. 30, 2008

(65) Prior Publication Data

US 2009/0034724 A1    Feb. 5, 2009

(30) Foreign Application Priority Data

Aug. 1, 2007 (FR) ..................................... 07 56867

(51) Int. Cl.
*H04L 9/06* (2006.01)
*H04K 1/00* (2006.01)

(52) U.S. Cl.
USPC ............................. 380/252; 380/29; 380/37

(58) Field of Classification Search
USPC ........................................ 380/28, 252, 29, 37
See application file for complete search history.

(56) References Cited

U.S. PATENT DOCUMENTS

2001/0053220 A1 * 12/2001 Kocher et al. ................... 380/29
2003/0191938 A1 * 10/2003 Woods et al. ................... 713/165
2004/0071291 A1    4/2004 Romain et al.
2004/0162991 A1    8/2004 Teglia et al.
2006/0256963 A1   11/2006 Gebotys

FOREIGN PATENT DOCUMENTS

EP    1587237 A1    10/2005

OTHER PUBLICATIONS

Messerges, Securing the AES Finalists Against Power Analysis Attacks, 2001, Retrieved from the Internet <URL: www.springerlink.com/content/u23965ctrfvwv0d7/>, pp. 1-15 as printed.*
French Search Report dated Mar. 18, 2008 from French Patent Application No. 07/56867.

* cited by examiner

*Primary Examiner* — Saleh Najjar
*Assistant Examiner* — Shu Chun Gao
(74) *Attorney, Agent, or Firm* — Wolf, Greenfield & Sacks, P.C.

(57) ABSTRACT

A method and a circuit for ciphering or deciphering data with a key by using at least one variable stored in a storage element and updated by the successive operations, the variable being masked by at least one first random mask applied before use of the key, then unmasked by at least one second mask applied after use of the key, at least one of the masks being dividable into several portions successively applied to the variable and which, when combined, represent the other mask.

28 Claims, 3 Drawing Sheets

MASKING OF DATA IN A CALCULATION

BACKGROUND OF THE INVENTION

1. Field of the Invention

The present invention generally relates to electronic circuits and, more specifically, to the masking of data manipulated by an electronic circuit in a calculation.

An example of application of the present invention relates to ciphering algorithms executed by integrated circuits and manipulating controlled-access digital quantities (for example, ciphering keys).

2. Discussion of the Related Art

Many methods are known to attempt to discover digital quantities manipulated by an electronic circuit, be they secret quantities (ciphering keys) or controlled-access data.

In particular, so-called covert channel attacks exploit information detectable from the outside of the circuit during the calculations without intervening on the circuit inputs/outputs. Among such attacks, the present invention, for example, aims at attacks by differential power analysis (DPA) or attacks by simple power analysis (SPA) of the electronic circuit when it executes a calculation manipulating secret quantities.

It is usual to use a random quantity to mask an operation manipulating a key. For example, a text to be ciphered is combined with a random quantity before being combined with the ciphering key, then again combined with the same random quantity to provide the ciphered text. This enables masking the correlation between the text to be ciphered (which is known) and the key (which is secret). On the deciphering side (for example, on the side of the receiver of the ciphered data), a similar method may be used. The ciphered text is combined with a random quantity before applying the ciphering key (identical or not to the ciphering key). Then, the intermediary result is combined with the same random quantity, which provides the deciphered text. Such a technique protects against DPA-type analyses.

However, if the random quantity used by a masking-unmasking operation can be detected, a correlation can be established, based on this random quantity and on the result, by examining the state transitions of a register containing a variable used for the calculation.

Document US-A-2004/0162991 describes a method according to which two registers are used to store intermediary results of the calculation, a single one of the registers containing the right result. This makes the detecting of the register content by measurement of the circuit power consumption in state switchings (on execution of the operations) more difficult. However, this is expensive in terms of integrated circuit surface area and requires the source and destination registers to be different.

SUMMARY OF THE INVENTION

An embodiment of the present invention aims at overcoming all or part of the disadvantages of known solutions for masking data in an electronic circuit.

An object of an embodiment of the present invention is a solution efficient against covert channel attacks, especially by analysis of the circuit power consumption (power analysis).

Another object of an embodiment of the present invention is a solution efficient against a recombination with a random quantity used as a mask.

To achieve all or part of these objects, as well as others, an embodiment of the present invention provides a method of ciphering or deciphering, by an integrated circuit, of data with a key by using at least one variable stored in a storage element and updated by successive operations, in which the variable is masked by at least one first random mask applied before use of the key, then unmasked by at least one second mask applied after use of the key, at least one of the masks being dividable into several portions successively applied to the variable and which, when combined, represent the other mask.

According to an embodiment of the present invention, the order of application of said portions of the mask is random.

According to an embodiment of the present invention, the mask is applied portion by portion for the masking and for the unmasking with a different order.

According to an embodiment of the present invention, the sizes of the portions of the mask are different from one another.

According to an embodiment of the present invention, the portions of the mask all have the same size.

According to an embodiment of the present invention, the portions of the mask have sizes smaller than the size of the variable and are applied to corresponding portions thereof.

According to an embodiment of the present invention, the size of each portion of the mask corresponds to that of the variable.

According to an embodiment of the present invention, the combination is of XOR type.

An embodiment of the present invention also provides an integrated circuit comprising an element capable of performing a ciphering or deciphering.

An embodiment of the present invention also provides a smart card comprising such a circuit.

An embodiment of the present invention also provides a broadcast signal decoder comprising such a circuit.

An embodiment of the present invention also provides a broadcasting system comprising means for implementing the method.

The foregoing and other objects, features, and advantages of the present invention will be discussed in detail in the following non-limiting description of specific embodiments in connection with the accompanying drawings.

DETAILED DESCRIPTION

Figure 1:
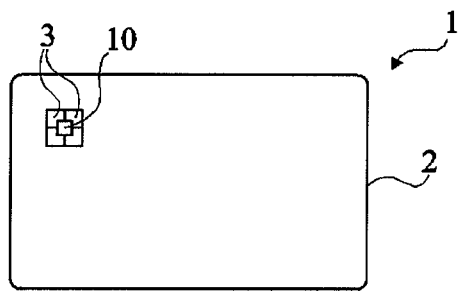
FIG. 1 shows a smart card of the type to which the present invention applies as an example.

The same elements have been designated with the same reference numerals in the different drawings.

For clarity, only those steps and elements which are useful to the understanding of the present invention have been shown and will be described. In particular, the exploitation of the digital data manipulated by the described method has not been detailed, the present invention being compatible with any conventional exploitation of algorithmic calculations.

FIG. 1 very schematically shows a smart card 1 of the type to which the present invention applies as an example. Such a card is, for example, formed of a support 2 of plastic matter in or on which is placed an electronic circuit chip 10 capable of communicating with the outside by means of contacts 3 or by means of contactless transceiver elements (not shown).

Circuit 10 of the card contains a processing unit having at least one function performing calculations on data by using a key considered as critical or with a controlled access. "Controlled access" is used to designate a digital quantity which is desired to be protected against hacking attempts, in particular of the type by analysis of the electronic circuit consumption.

Figure 2:
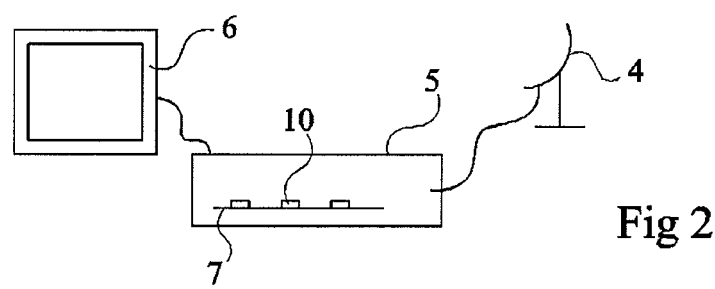
FIG. 2 very schematically shows a broadcast signal receiver of the type to which the present invention applies as an example.

FIG. 2 shows another example of application of the present invention to controlled-access broadcasting systems. In this example, an antenna 4 receives signals coming from a satellite (not shown) and transmits them to a decoder 5 for display on a television set 6. Decoder 5 comprises one or several electronic boards 7 provided with one or several circuits 10 for processing received digital data. This processing comprises a decoding (deciphering) by means of one or several keys owned by decoder 5. The keys are contained in memories associated with electronic circuit 10 or on an external element, for example, a smart card introduced into decoder 5.

Figure 3:
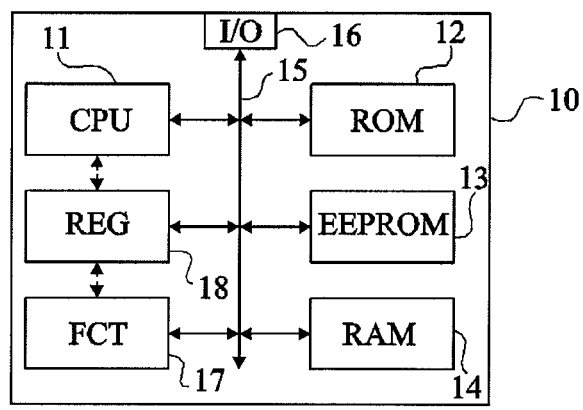
FIG. 3 is a block diagram of an example of the architecture of an electronic circuit of the type to which the present invention applies as an example.

FIG. 3 is a block diagram of an embodiment of an electronic circuit 10. This circuit comprises a central processing unit 11 (CPU) capable of executing programs contained in one or several memories. In this example, circuit 10 comprises a non-volatile non-reprogrammable memory 12 (ROM), a reprogrammable non-volatile memory 13 (EPROM), and a RAM 14. One or several data, address, and control buses 15 are used as a support for the communication between the different components of circuit 10 and with an input/output interface 16 (I/O) for communication with or without contact with the outside. Most often, circuit 10 comprises other functions (block 17, FCT) depending on the application. These are, for example, a dedicated cryptographic calculation cell for implementing ciphering and deciphering algorithms. Such algorithms are, according to the application and to the circuit power consumption, implemented by the processing unit or by a dedicated cell. The calculations exploit temporary storage elements 18 (for example, registers) assigned to unit 11 and/or to cell 17, and operators for a hardware (wired logic) or at least partially software implementation.

After, and according to an embodiment, the data to be processed by means of the algorithm exploiting the key will be designated as PT (Plain Text), the key (or the data to be protected) will be designated as K, and the (ciphered) data resulting from the application of the algorithm to data PT with key K will be designated as CT (ciphered text). Data PT generally originate from the outside of circuit 10 and are temporarily stored in a volatile storage element (register 18 or memory 14). Key K is often contained in a non-volatile memory element (12 or 13) or is temporarily derived from another key contained in such an element.

Figure 4:
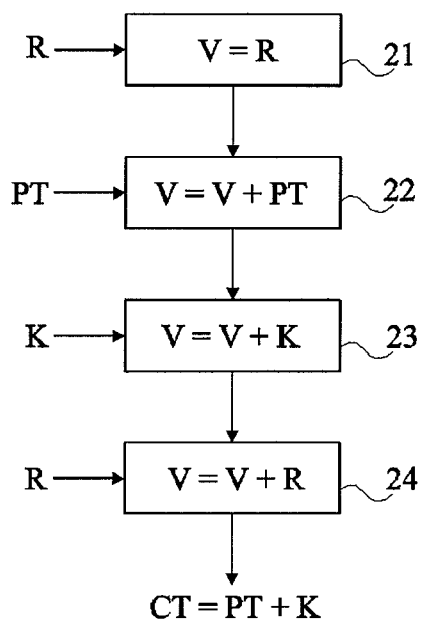
FIG. 4 is a simplified flowchart illustrating an example of a method for ciphering digital data.

FIG. 4 illustrates a usual masking mode by means of a random quantity R of the same size (number of bits) as quantities PT and K. The calculations are generally performed by using a single result variable V (a same register) updated along the successive steps.

A first step (block 21, V=R) comprises loading a random quantity R into result variable V. Then (block 22, V=V+PT), the data to be ciphered are combined (generally, by XOR, that is, a bit-to-bit addition designated with symbol "+") with random quantity R. Then (block 23, V=V+K), key K is combined with the intermediary result to provide the ciphered data and, finally (block 24, V=V+R), the intermediary result is unmasked by applying again the same random quantity R, which provides ciphered text CT.

Quantity CT does not enable finding a correlation between data PT and K. However, if quantity R can be detected by a person attempting fraud, its recombination with the result provides a correlation between quantities PT and K again. Now, quantity R is present, for example, in the register storing variable V at the first step. Accordingly, by interpreting the state switchings of variable V in the combinations of steps 21 and 23, a person attempting to fraud can, knowing data PT, discover key K, since R+((R+PT)+K)=PT+K.

Figure 5:
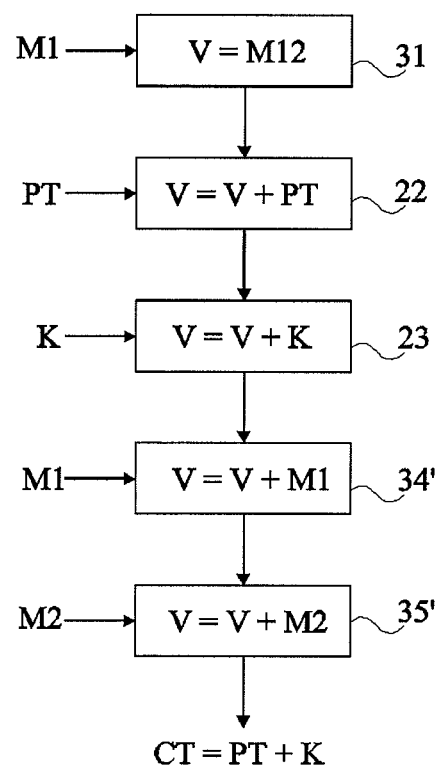
FIG. 5 is a simplified flowchart illustrating an embodiment of the masking of a ciphering operation.

FIG. 5 illustrates an embodiment in which different random quantities are used to mask and unmask the calculations. As previously, a same variable V contains the successive results of the performed operations.

A first step (block 31, V=M12) comprises loading a first masking quantity M12 into result variable V. This quantity corresponds to a combination of two other quantities M1 and M2 (M12=M1+M2) performed separately from the calculation. For example, quantity M12 is precalculated based on two quantities M1 and M2 resulting from a random selection. None of quantities M1 and M2, however transits through variable V just before step 31. Then (block 22, V=M12+PT), data PT to be ciphered are combined with quantity M12. As a variation, steps 31 and 22 are inverted, that is, data PT are first loaded into the register of variable V, then combined with quantity M12. Then (block 23, V=V+K), the intermediary result (masked data PT) is combined with key K. The unmasking is then performed by successively using random quantities M1 and M2 (or M2 and M1). Thus, quantity M1 is first combined (block 34', V=V+M1) with the intermediary result contained in variable M12, then this is done with quantity M2 (block 35', V=V+M2) to provide ciphered data CT. It can be considered that mask M12 is applied portion by portion (M1, then M2) for the unmasking, after having been masked by a quantity (quantity M12) different from M1 and from M2, masks M1, M2, and M12 having a size equal to that of the manipulated data.

An advantage is that no point in the calculation provides the value of masks M1 and M2 or result M12 of their combination. Accordingly, it becomes more complicated for a person attempting to fraud to find key K. He would need to monitor the transitions in combinations of steps 31, 22, 23, 34', and 35' to come back across a correlation of data PT and K.

Now, the more the number of combinations to be monitored by the person attempting to fraud increases, the more he needs to be able to accurately determine the times (points in the calculation) at which the states of the temporary storage element storing variable V transit towards the desired intermediary results. The task of a person attempting to fraud is thus made more complex, or even almost impossible by increasing the number of successively-used random quantities. The counterpart of such an implementation is a lengthening of the duration of the ciphering and deciphering.

A similar technique may be implemented on the deciphering side.

As a variation, quantities M1 and M2 are used before combination with key K, and the unmasking is performed by quantity M12.

Figure 6:
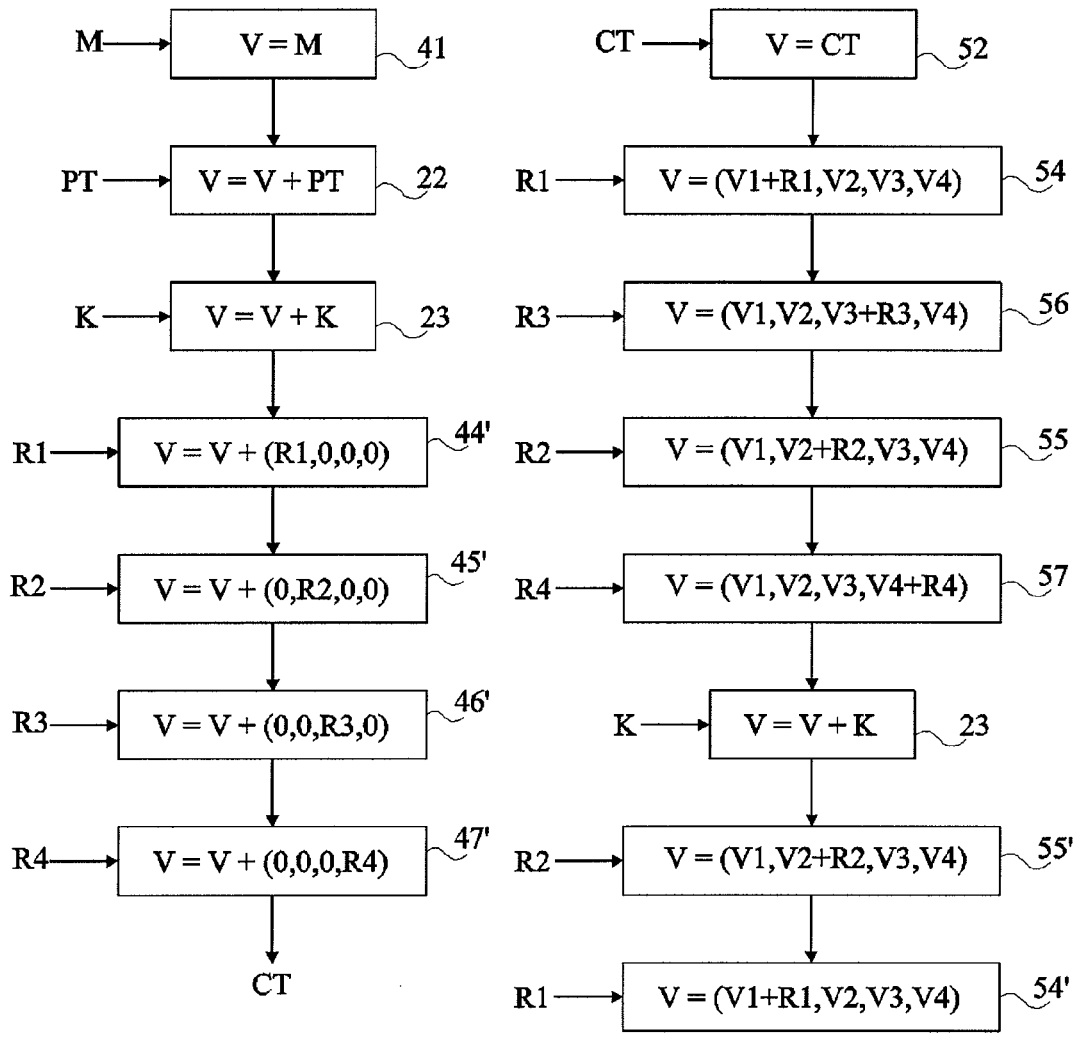
FIG. 6 is a simplified flowchart illustrating another embodiment.

FIG. 6 illustrates another embodiment according to which a mask M is formed of a random quantity dividable into portions applied in a different order at the masking and at the unmasking. The entire mask (the concatenation of the portions) has, preferably, the size of the data to be ciphered PT (or to be deciphered CT) and of key K.

In the example of FIG. 6, mask M is applied at once to the data to be ciphered (block 41, V=M and block 22, V=V+PT). The key is then applied (block 23, V=V+K). The application by portion is performed at the level of the unmasking where the n mask portions are successively applied to the corresponding portions of the intermediary result variable. Taking as an example a mask M=(R1, R2, R3, R4), where R1 to R4 designate 4 (n=4) random portions forming, once concatenated, mask M and by designating as V1, V2, V3, and V4 the corresponding portions of the result variable, V=(V1, V2, V3, V4), this amounts to successively performing the four combinations illustrated in blocks 44' (V=V+(R1, 0, 0, 0)), 45' (V=V+(0, R2, 0, 0)), 46' (V=V+(0, 0, R3, 0)), and 47' (V=V+ (0, 0, 0, R4)). The order of steps 44' to 47' has no importance for the recovery of ciphered text CT. Of course, portions R1 to R4 are not identical to one another, the probability for them to be all identical (M={0} or M={1}) being negligible due to the random selection. The mask is stored, between the masking and unmasking operations, in a temporary storage element (for example, one of registers 18 or an area of memory 14).

According to a preferred embodiment, this order is random. It is enough for this to perform a random selection of ranks 1 to 4 of the required portions. This amounts to performing a random permutation. The random selection preferentially changes for each ciphering or deciphering.

Figure 7:
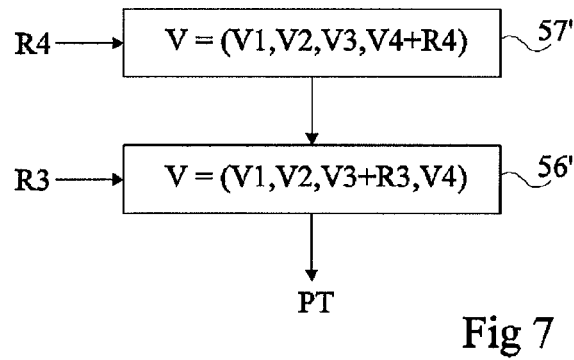
FIG. 7 is a simplified flowchart illustrating another embodiment.

FIG. 7 illustrates another embodiment according to which the application of the mask by portion is performed for the masking and the unmasking. This drawing takes, as an example, a deciphering of a text CT into a text PT and an initialization of variable V (block 52, V=CT) with the data rather than with the mask. Instead of performing a combination of the entire intermediary result with a word having a portion only which is non-zero as in the example of FIG. 6 (0 representing the neutral element of the combination operation), FIG. 7 illustrates another possibility which is to only combine, each time, the relevant portions. The two methods may, of course, be combined.

The mask is applied in order R1 (block 54, V=(V1+R1, V2, V3, V4)), R3 (block 56, V=(V1, V2, V3+R3, V4)), R2 (block 55, V=(V1, V2+R2, V3, V4)), R4 (block 57, V=(V1, V2, V3, V4+R4)) before combination 23 with the key, then reapplied for the unmasking in the order R2 (block 55', V=V1, V2+R2, V3, V4)), R1 (block 54', V=(V1+R1, V2, V3, V4)), R4 (block 57', V=(V1, V2, V3, V4+R4)), R3 (block 56', V=(V1, V2, V3+R3, V4)).

The random selection preferentially setting the masking order needs not be held (stored) to obtain the unmasking order, which is obtained by another random selection. This makes a possible hacking even more difficult.

According to another variation, the mask is partly applied to the masking and entirely to the unmasking.

The selection of the number of portions, that is, the granularity (bit, doublet, byte, etc.) of mask M is a compromise between the desired security and the additional calculation time.

Specific embodiments of the present invention have been described. Various alterations and modifications will occur to those skilled in the art. In particular, calculation steps other than the combination with the key may be inserted between the masking and unmasking steps. These steps depend on the used ciphering algorithm. As an example, ciphering algorithms known under denominations DES, AES, RSA may be used.

Further, other combination functions may be implemented, provided that respect the properties of a possible partial masking and/or unmasking are respected. Similarly, the mask portions are not necessarily of identical sizes, or identical for the masking and the unmasking, provided to be applied to corresponding portions of variable V.

Moreover, different permutation functions or even more complex functions may be implemented. For example, the function implemented in the embodiment of FIG. 6 is of the type described in document US-A-2001/0054163, which is incorporated herein by reference, and comprises randomly selecting the position of the mask portion and the next positions by adding, to the preceding position, a random number generated once at the beginning and respecting the constraint of being prime with the size of the data to be masked.

According to another example, this function is of the type described in U.S. Pat. No. 7,116,783, which is incorporated herein by reference, and comprises randomly selecting the position of the portion and repeating this random selection until all the mask portions have been processed, where some of them can have been so several times.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of ciphering or deciphering, by an integrated circuit, of data with a key by using at least one variable stored in a storage element and updated by successive operations, wherein:
   the at least one variable loaded with the data is masked by at least one first random mask applied before use of the key;
   the at least one masked variable is unmasked by at least one second mask applied after use of the key;
   the at least one first random mask is generated by at least one hardware processor using a first plurality of random quantities, the first plurality of random quantities comprising portions of the at least one first mask that are successively applied, in a first order, to the at least one variable for masking the at least one variable;
   the at least one second mask comprises a second plurality of random quantities comprising portions of the at least one second mask that are successively applied, in a second order that is different from the first random order, to the at least one masked variable for unmasking the at least one masked variable;
   the first plurality of portions random quantities of the at least one first random mask, when combined, represent the at least one second mask; and
   the second plurality of random quantities of the at least one second mask, when combined, represent the at least one first random mask.

2. The method of claim 1, wherein the first order is random and the second order is random.

3. The method of claim 1, wherein sizes of the portions of each of the first random mask and the second mask are different from one another.

4. The method of claim 1, wherein the portions of each of the first random mask and the second mask all have the same size.

5. The method of claim 1, wherein the portions of each of the first random mask and the second mask have sizes smaller than a size of the at least one variable and are applied to corresponding portions of the at least one variable.

6. The method of claim 4, wherein the size of each portion of each of the first random mask and the second mask corresponds to that of the at least one variable.

7. The method of claim 1, wherein the combination is of XOR type.

8. An integrated circuit comprising an element capable of performing the ciphering or deciphering of claim 1.

9. A smart card comprising the circuit of claim 8.

10. A broadcast signal decoder comprising the circuit of claim 8.

11. A broadcasting system comprising:
an integrated circuit for ciphering data with a key by:
masking at least one variable loaded with the data and stored in a storage element, on a portion-by-portion basis, successively in a first random order, with two or more portions of a first mask; and
applying the key to the at least one masked variable, wherein:
the at least one masked variable is unmasked by successively applying to the at least one masked variable, in a second random order that is different from the first random order, a second mask, wherein two or more portions of the second mask, when combined, form the first mask.

12. A method of ciphering or deciphering data with a key, by an integrated circuit, the method comprising:
providing at least one variable loaded with the data;
masking the at least one variable, successively in a first random order, with two or more portions of a first mask, using at least one hardware processor;
applying the key to the at least one masked variable; and
after the key has been applied to the at least one masked variable, unmasking the at least one variable, successively in a second random order that is different than the first random order, with two or more portions of a second mask, wherein the two or more portions of the second mask, when combined, are equal to the first mask.

13. The method of claim 12, wherein sizes of the two or more portions of the first mask are different from one another.

14. The method of claim 12, wherein sizes of the two or more portions of the first mask are the same.

15. The method of claim 12, wherein the two or more portions of the first mask have sizes smaller than a size of the variable.

16. The method of claim 4, wherein a size of each of the two or more portions of the first mask corresponds to that of the variable.

17. An integrated circuit comprising:
at least one hardware processor capable of performing ciphering or deciphering of data with a key by:
masking at least one variable loaded with the data, successively in a first random order, with two or more portions of a first mask;
applying the key to the at least one masked variable; and
after the key has been applied to the at least one masked variable, unmasking the at least one masked variable, successively in a second random order that is different than the first random order, with two or more portions of a second mask, wherein the two or more portions of the second mask, when combined, are equal to the first mask.

18. The integrated circuit of claim 17, incorporated into a smart card.

19. The integrated circuit of claim 17, incorporated into a broadcast signal decoder.

20. The broadcasting system of claim 11, wherein the two or more portions of the first mask are of different sizes.

21. The broadcasting system of claim 11, wherein the two or more portions of the second mask are of different sizes.

22. The broadcasting system of claim 11, wherein the two or more portions of the first mask and the two or more portions of the second mask have sizes smaller than a size of the at least one variable and are applied to corresponding portions of the at least one variable.

23. The broadcasting system of claim 11, wherein a size of each portion of the first mask and the second mask corresponds to a size of a corresponding portion of the at least one variable.

24. A broadcasting system comprising:
an integrated circuit for deciphering ciphered data combined with a key by:
unmasking at least one variable loaded with the ciphered data and stored in a storage element, on a portion-by-portion basis, successively in a first random order, with two or more portions of a first random mask, wherein:
the at least one variable has been masked on a portion-by-portion basis, successively in a second random order that is different from the first random order, with two or more portions of a second mask, wherein the two or more portions of the second mask, when combined, form the first random mask.

25. The broadcasting system of claim 24, wherein an order of application of the two or more portions of the first random mask is random.

26. The broadcasting system of claim 24, wherein the two or more portions of the first random mask are of different sizes.

27. The broadcasting system of claim 24, wherein the two or more portions of the first random mask have sizes smaller than a size of the at least one variable and are applied to corresponding portions of the at least one variable.

28. The broadcasting system of claim 27, wherein the size of each portion of the two or more portions of the first random mask corresponds to a size of a corresponding portion of the at least one variable.

* * * * *